United States Patent
Lu et al.

(10) Patent No.: US 6,742,221 B2
(45) Date of Patent: Jun. 1, 2004

(54) HINGE FOR A NOTEBOOK COMPUTER

(75) Inventors: Sheng-Nan Lu, Shulin (TW); Chia-Hui Chen, Shulin (TW); Jih-Nan Tai, Shulin (TW); Hua-Chung Tseng, Hsi-Chih (TW); Chu-Hsian Chian, Hsi-Chih (TW); Chao-Teh Ho, Hsi-Chih (TW); Chun-Hsi Shen, Hsi-Chih (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 34 days.

(21) Appl. No.: 10/289,658

(22) Filed: Nov. 6, 2002

(65) Prior Publication Data

US 2004/0083577 A1 May 6, 2004

(51) Int. Cl.$^7$ ................................................. E05D 3/06
(52) U.S. Cl. ........................... 16/367; 16/366; 248/917; 248/919; 361/681
(58) Field of Search .......................... 16/366, 367, 342; 248/917, 919, 922, 923; 361/681, 682, 683

(56) References Cited

U.S. PATENT DOCUMENTS

| 4,547,027 | A | * | 10/1985 | Scheibenreif | ................. | 439/13 |
|---|---|---|---|---|---|---|
| 6,032,918 | A | * | 3/2000 | Cho | ............................ | 248/688 |
| 6,161,255 | A | * | 12/2000 | Garrett | ......................... | 16/284 |
| 6,189,842 | B1 | * | 2/2001 | Bergeron Gull et al. | . | 248/125.1 |
| 6,268,997 | B1 | * | 7/2001 | Hong | .......................... | 361/681 |
| 6,510,049 | B2 | * | 1/2003 | Rosen | ......................... | 361/681 |
| 6,587,333 | B2 | * | 7/2003 | Tseng et al. | ................. | 361/381 |
| 6,595,481 | B1 | * | 7/2003 | Huang et al. | ............. | 248/349.1 |

* cited by examiner

Primary Examiner—Gary S. Hartmann
(74) Attorney, Agent, or Firm—Dellett & Walters

(57) ABSTRACT

A hinge for a notebook computer is composed of an upper seat, a lower seat, and two arms. The upper seat is rotatably mounted in the lower seat, and the arms are mounted on the upper seat. A monitor of the computer is installed on the arms, and the lower seat is secured on a body of the computer. Therefore, the monitor can be turned about the arms to raise from the body, and turned along with the upper seat about a vertical axis of the lower seat to adjust a visible scope.

9 Claims, 7 Drawing Sheets

HINGE FOR A NOTEBOOK COMPUTER

BACKGROUND OF THE INVENTION

1. Field of the Invention

The present invention is related to a hinge for a notebook computer, and more particularly to a hinge by which a monitor of the notebook computer can be turned about a vertical axis and a horizontal axis.

2. Description of Related Art

In conventional notebook computers, monitors generally can be only pivoted about a horizontal axis to raise from bodies. Few notebook computers have monitors which can be turned about a vertical axis to adjust a visible scope. However, in all of these computers, the monitors can be only adjusted in a maximum scope of 60. Furthermore, most rotating devices of these computers are made up of zinc alloy, which is easy to be worn down after a long term of using.

Therefore, the invention provides a hinge for a notebook computer to mitigate and/or obviate the aforementioned problems.

SUMMARY OF THE INVENTION

The main objective of the invention is to provide a hinge for a notebook computer by which a monitor of the computer can be turned about a vertical axis in a maximum scope of 180.

Another objective of the invention is to provide a hinge for a notebook computer that has anti-friction structures provided therein.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
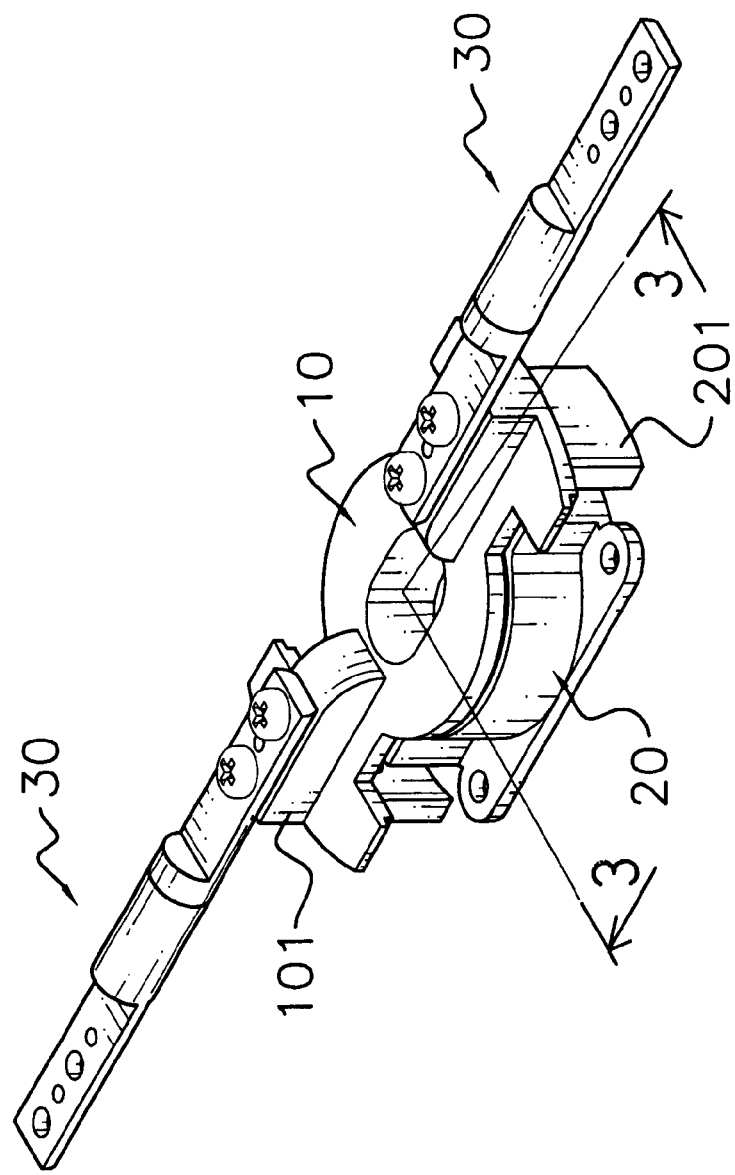
FIG. 1 is a perspective view of a hinge for a notebook computer in accordance with the invention.
Figure 2:
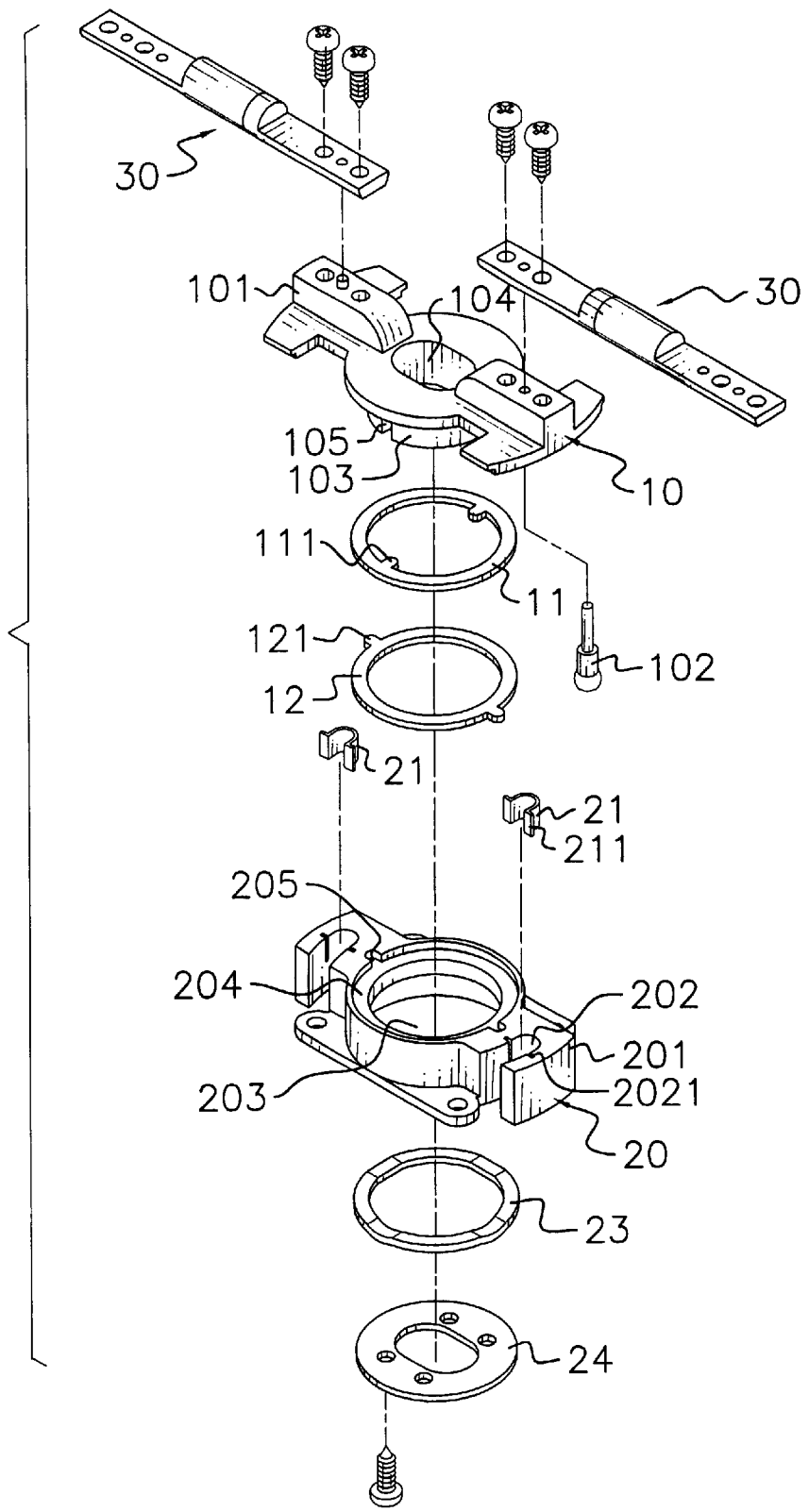
FIG. 2 is an exploded perspective view of the hinge in FIG. 1.
Figure 3:
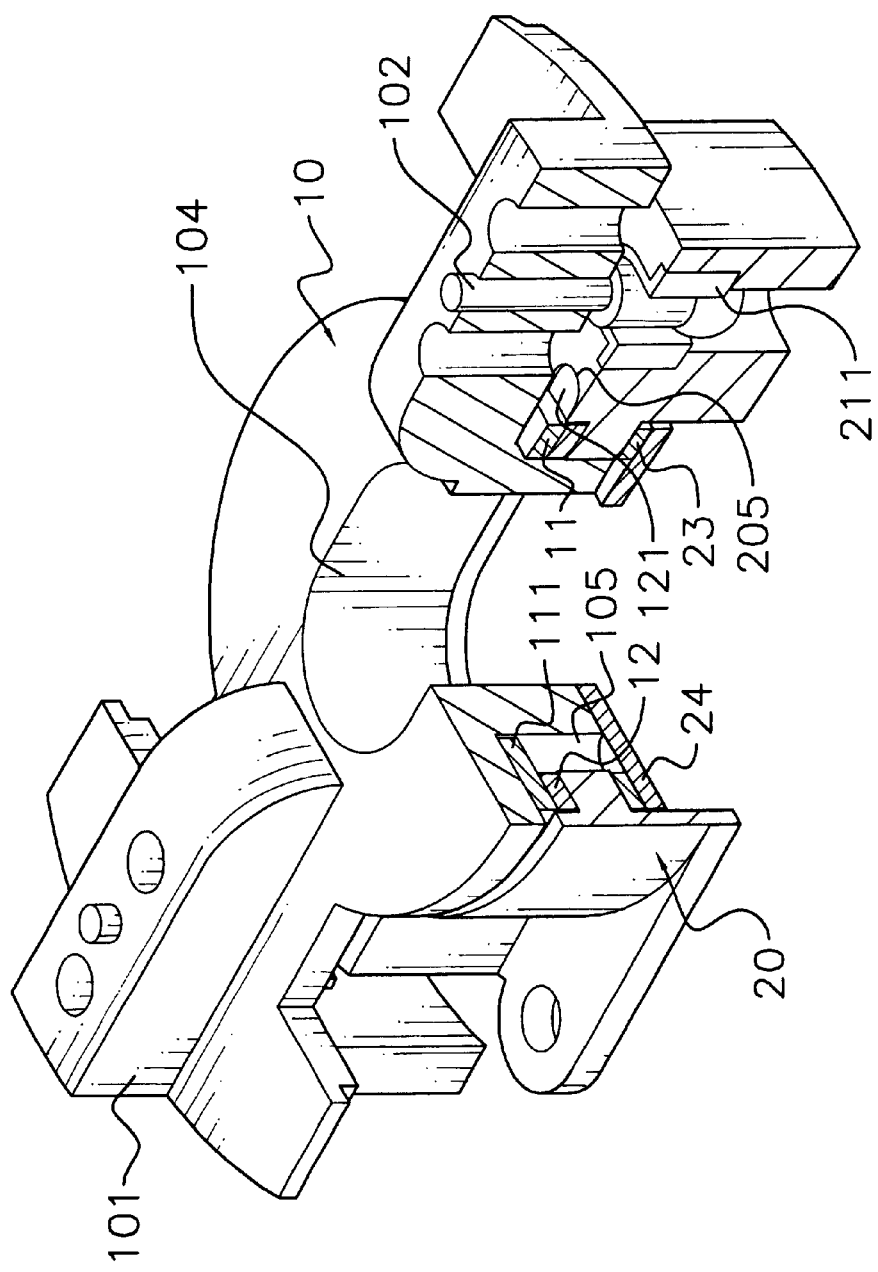
FIG. 3 is a perspective sectional view of the hinge along the line "3—3" in FIG. 2.

Referring to FIGS. 1–3, a hinge for a notebook computer is composed of an upper seat (10), a lower seat (20), and two arms (30).

The upper seat (10) has an opening (104) defined therethrough, and two wings (101) oppositely extending outwards from the opening (104). A flange (103) is formed at a bottom of the upper seat (10), and two first notches (105) are defined at diametrically opposite sides of the flange (103). A pin (102) is mounted in one of the wings (101) from a bottom of the wing (101).

The lower seat (20) under the upper seat (10) has a central hole (203) defined therethrough, and the flange (103) of the upper seat is rotatably received in the central hole (203). A recess (204) is defined at a top of the lower seat (20) and two second notches (205) are defined at diametrically opposite sides of the recess (204).

A first ring (11) and a second ring (12) are provided between the upper seat (10) and the lower seat (20), and outside the flange (103). The first ring (11) has two first lugs (111) formed at an inner circumferential side thereof and respectively received in the first notches (105). The second ring (12) is provided beneath the first ring (11) and received in the recess (204), and has two second lugs (121) formed at an outer circumferential side thereof and respectively received in the second notches (205).

The lower seat (20) further has two ears (201) respectively formed at two diametrically opposite sides thereof and corresponding to the wings (101). Two channels (202) are respectively defined in the ears (201), and each channel (202) has an open side (not numbered) at the same side of the lower seat (20), so that the pin (102) can be turned 180 through the open sides of the channels (202). Two grooves (2021) are defined at two opposite inner walls of the channel (202), and two collars (21) which each have a -like section and two feet (211) are respectively mounted in the channels (202) by the feet (211) positioned in the grooves (2021).

In an original status, the pin (102) is located in one of the channels (202) and positioned in the corresponding collar (21), as specially shown in FIG. 3. When the upper seat (10) is turned 180, the pin (102) is located in the other channels (202) and positioned in the other collar (21).

A gasket (24) is mounted on a bottom of the upper seat (10) by fasteners (not numbered) and is movable along with the upper seat (10) beneath the lower seat (20), so that the upper seat (10) is rotatably installed in the lower seat (20). A washer (23) is provided between the lower seat (20) and the gasket (24) to prevent the direct friction between the lower seat (20) and the gasket.(24).

The arms (30) are respectively mounted on the wings (101), and each arm (30) has a first part secured on the respective wing (101), and a second part rotatable about the first part, on which a monitor of the notebook computer is installed.

Figure 4:
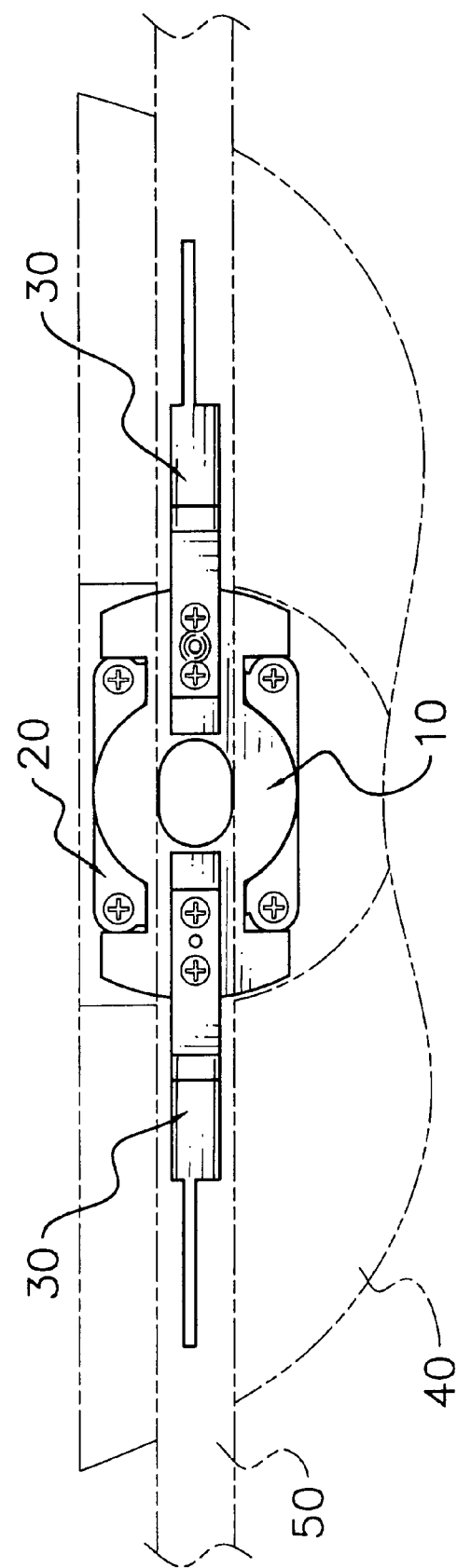
FIG. 4 is a top view of the hinge when a monitor of a notebook computer assembled by the hinge is raised.
Figure 5:
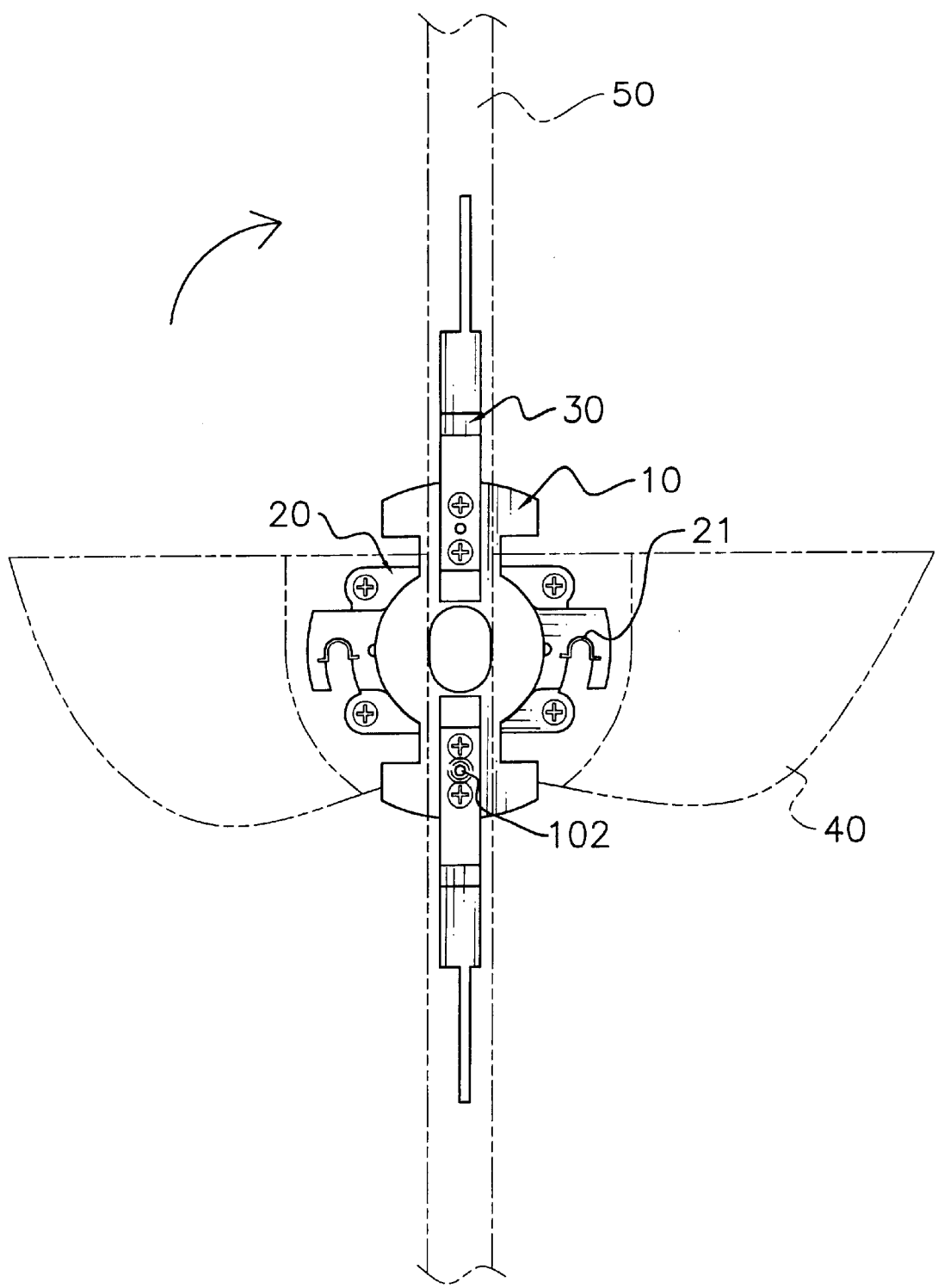
FIG. 5 is a top view of the hinge when the monitor in FIG. 4 is turned about a vertical axis.
Figure 6:
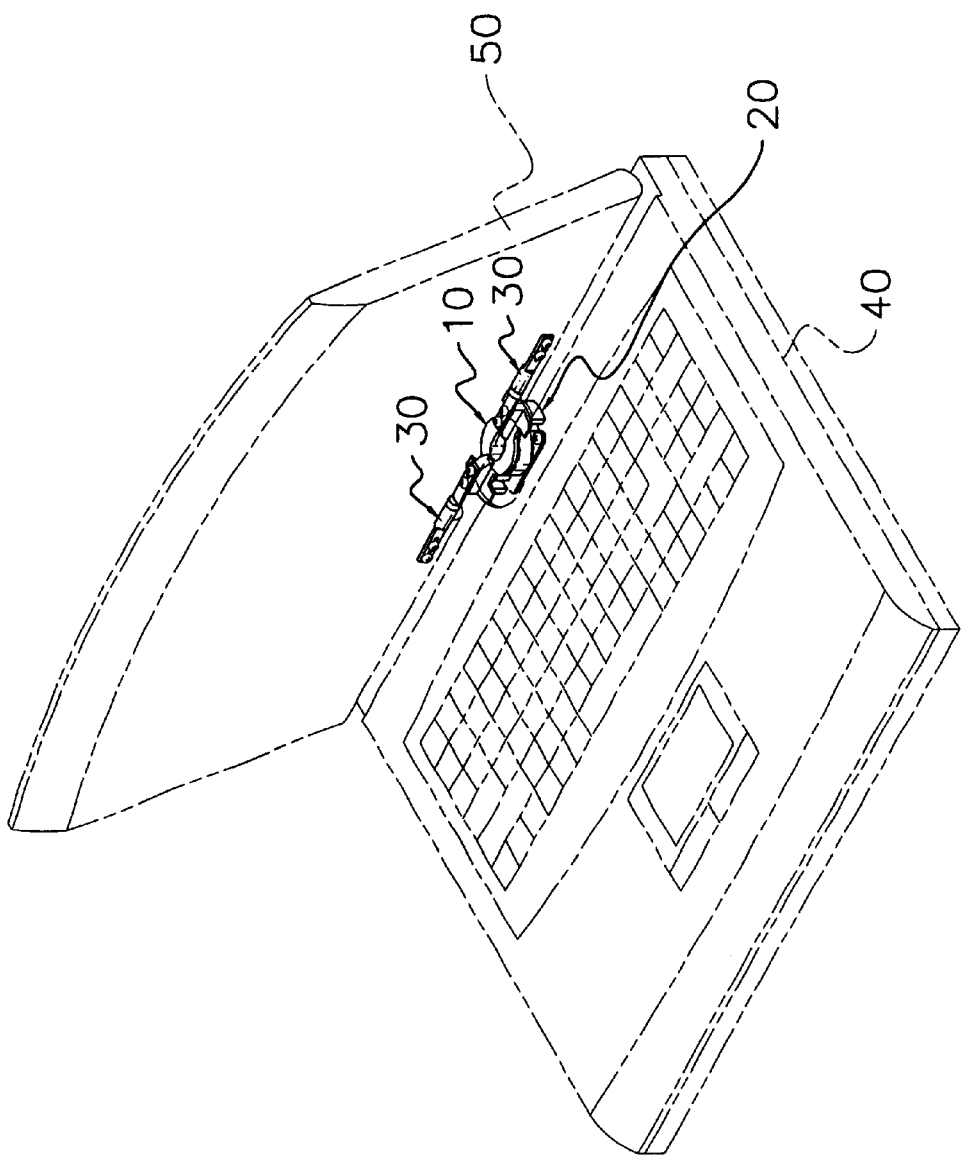
FIG. 6 is a perspective view showing that the monitor of the notebook computer is raised.
Figure 7:
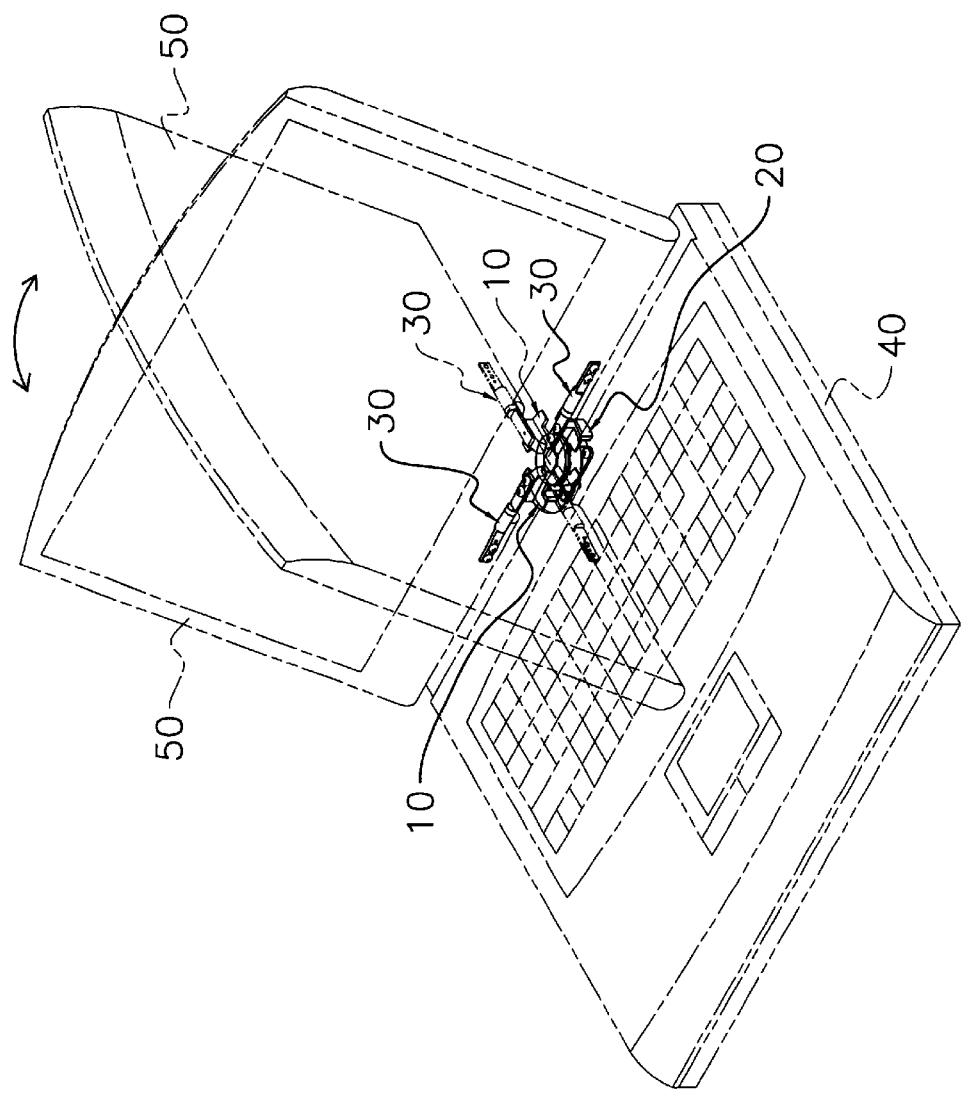
FIG. 7 is a perspective view showing that the raised monitor is turned about the vertical axis.

Referring to FIGS. 4–7, the lower seat (20) is installed on a body (40) of the notebook computer, and a monitor (50) is installed on the arms (30). Electrical wires (not shown or numbered) extend through the central hole (203) and the opening (104) to electrically connect the body (40) and the monitor (50). The monitor (50) can be turned about the arms (30) to raise from the body (40), as shown in FIGS. 4 and 6. In the raised position, the monitor (50) can be turned along with the upper seat (10) about a vertical axis of the lower seat (20) in a maximum scope of 180, as shown in FIGS. 5 and 7.

From the above description, it is noted that the invention has the following advantages:

1. The monitor in the raised position can be turned about a vertical axis in a maximum scope of 180.
2. The rings securely positioned by the lugs will not move when the upper seat is rotated about the upper seat, and can prevent the direct friction between the upper seat and the lower seat, so that the hinge has a long using-life.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge for a notebook computer comprising:

an upper seat (10) having an opening (104) defined therethrough, two wings (101) respectively formed at diametrically opposite sides of the opening (104), a flange (105) formed at a bottom of the upper seat (10), and a pin (102) mounted in one of the wings (101) from a bottom surface of this wing (101);

a lower seat (20) under the upper seat (10), the lower seat (20) having a central hole (203) in which the flange (105) of the upper seat (10) is rotatably received, two ears (201) respectively formed at diametrically opposite sides of the central hole (203) and corresponding to the wings (101), the ears (201) each having a channel (2021) with an open side at the same side of the lower seat (20) in which the pin (102) can be located, and a gasket (24) movably provided beneath the lower seat (20) and fastened on the bottom of the upper seat (10) to rotatably install the upper seat (10) in the lower seat (20); and two arms (30) respectively mounted on the wings (101) of the upper seat (10), each arm (30) having a first part secured on the respective wing (101), and a second part rotatable about the first part.

2. The hinge as claimed in claim 1 further comprising a first ring (11) provided between the upper seat (10) and the lower seat (20), and outside the flange (103).

3. The hinge as claimed in claim 2, wherein the flange (103) has two first notches (105) defined at diametrically opposite sides thereof, and the first ring (11) has two first lugs (111) formed at an inner circumferential side thereof and respectively received in the first notches (105).

4. The hinge as claimed in claim 2 further comprising a second ring (12) provided between the first ring (11) and the lower seat (20), and outside the flange (103).

5. The hinge as claimed in claim 4, wherein the lower seat (20) has a recess (204) defined at a top thereof, and the second ring (12) is received in the recess (204).

6. The hinge as claimed in claim 5, wherein the lower seat (20) has two second notches (205) defined at diametrically opposite sides of the recess (204), and the second ring (12) has two second lugs (121) formed at an outer circumferential side thereof and respectively received in the second notches (205).

7. The hinge as claimed in claim 1, wherein the lower seat (20) has two-like collars (21) respectively mounted in the channels (202).

8. The hinge as claimed in claim 7, wherein each of the channels (202) has two grooves (2021) respectively formed at two opposite inner wall thereof, and the collar (21) has two feet (211) respectively positioned in the grooves (2021).

9. The hinge as claimed in claim 1 further comprising a washer (23) provided between the lower seat (20) and the gasket (24).

* * * * *